United States Patent
Kazama et al.

[11] Patent Number: 5,888,321
[45] Date of Patent: Mar. 30, 1999

[54] SUPER HIGH TENSILE STEEL WIRE FOR RUBBER PRODUCT REINFORCEMENT, STEEL CORD USING THIS STEEL WIRE AND RADIAL TIRE USING THIS STEEL CORD

[75] Inventors: Hiroshi Kazama; Kazuhiro Ishimoto, both of Niihari-gun, Japan

[73] Assignee: Tokyo Rope Manufacturing Co., Ltd., Tokyo, Japan

[21] Appl. No.: 648,340

[22] Filed: May 15, 1996

[30] Foreign Application Priority Data

May 16, 1995 [JP] Japan ................................. 7-140083

[51] Int. Cl.$^6$ ........................................... B60C 9/00
[52] U.S. Cl. ........................... 152/451; 428/607; 428/625; 428/677; 152/565; 57/902
[58] Field of Search ..................... 428/607, 625, 428/677; 152/565, 451; 57/902

[56] References Cited

U.S. PATENT DOCUMENTS

| | | | |
|---|---|---|---|
| 2,002,263 | 5/1935 | Domm | 91/68 |
| 3,254,971 | 6/1966 | Forsberg | 29/191.6 |
| 4,020,887 | 5/1977 | Vlasov et al. | 152/359 |
| 4,258,543 | 3/1981 | Canevari et al. | 57/212 |
| 4,592,935 | 6/1986 | Sato et al. | 428/659 |
| 4,732,197 | 3/1988 | Hseishi et al. | 452/451 |
| 4,883,722 | 11/1989 | Coppens et al. | 428/625 |
| 4,952,249 | 8/1990 | Dambre | 148/11.5 |
| 5,014,760 | 5/1991 | Bombeke et al. | 152/451 |
| 5,234,044 | 8/1993 | Bourgois | 152/527 |
| 5,240,520 | 8/1993 | Tarui et al. | 148/532 |
| 5,293,737 | 3/1994 | Kobayashi et al. | 457/236 |
| 5,784,874 | 7/1998 | Bruyneel et al. | 57/237 |

*Primary Examiner*—Nam Nguyen
*Assistant Examiner*—Steven H. Ver Steeg
*Attorney, Agent, or Firm*—Michael J. Striker

[57] ABSTRACT

The steel wire for making steel cord used in rubber product reinforcement has a tensile strength, Y in N/mm$^2$, such that $Y \geq -1960d+3920$, wherein d is the wire diameter in mm, and also a flat Vickers hardness distribution in a cross-section perpendicular to a length direction thereof from the surface to the interior, but excluding a central portion having a central portion diameter corresponding to ¼ of the wire diameter. The steel wire is made by a method including wet drawing a carbon steel wire rod material containing 0.80 to 0.89% by weight carbon to a predetermined intermediate diameter and subsequently heat-treating and plating to form a final raw material and then wet drawing the final raw material to form the steel wire. The wet drawing steps are performed with drawing dies, each of which is provided with a drawing hole having a drawing hole diameter $d_1$ and the drawing die has an approach angle $2\alpha$ equal to from 8° to 10° and a bearing length of 0.3 $d_1$. The wet drawing of the final raw material includes a final drawing step performed with a double die and the steel wire immediately after passing through the final drawing die has its temperature controlled so as to be less than 150° C.

2 Claims, 6 Drawing Sheets

SUPER HIGH TENSILE STEEL WIRE FOR RUBBER PRODUCT REINFORCEMENT, STEEL CORD USING THIS STEEL WIRE AND RADIAL TIRE USING THIS STEEL CORD

BACKGROUND OF THE INVENTION

1. Field of the Invention

This invention relates to a super high tensile steel wire used for rubber product reinforcement, a steel cord using this steel wire and a radial tire using this steel cord.

2. Prior Art

As reinforcing materials for rubber products (elastomer products) such as automobile tires, conveyor belts and high-pressure hoses, steel wire and steel cord made by twisting together a plurality of steel wires have been used. Steel wire is also called steel filament, and steel cord is also called steel cable.

These kinds of reinforcing material, due to the conditions in which they are used and the purposes for which they are used, are required to have excellent characteristics of strength, toughness and fatigue resistance. Also, recently, with respect to rubber products, there has been a strong demand for reductions in cost, increases in ease of handling and weight reductions. In particular, weight reduction is considered important in automobile tires from such points of view as that of reducing fuel consumption, and for this reason increases in the strength of steel wire are becoming still more necessary.

However, when such strength increases are simply sought by just raising the degree of working in the wire drawing process, the toughness of the steel wire deteriorates and as a result the drawing and twisting processes become problematic and it is not possible to obtain a steel wire with the necessary characteristics. Also, the problem arises that, when a plurality of steel wires are twisted together to make a steel cord, the decrease in strength caused by this twisting is great and consequently the reason for having increased the strength of the steel wire is lost.

Conventionally, steel wire has usually been manufactured by drawing to an intermediate diameter of a predetermined value and then sequentially heat-treating, plating and drawing a carbon steel wire rod material whose carbon content is about 0.70 to 0.75 wt %. The tensile strength Y of the steel wire in this case, generally, as shown in FIG. 1, in relation to the wire diameter d, has been in the range $Y \geq -1960d+3283$ (N/mm²). To respond to subsequent demands for higher strength, using carbon steel wire rod material whose carbon content is about 0.80 to 0.89 wt %, the practical use of high tensile steel wire having a tensile strength $Y \geq -1960d+3577$ (N/mm²) has been realized.

However, to respond to recent demands of the kind mentioned above a super high strength of the level $Y \geq -1960d+3920$ (N/mm²) is necessary, and the present situation is that with the carbon content range mentioned above, the practical use of steel wire of this strength has not been realized due to problems of manufacturing and toughness deterioration.

More specifically, the manufacture in itself of a steel wire of a super high strength in the range $Y \geq -1960d+3920$ is probably possible. That is, for example by using a high carbon steel wire rod material having a high carbon content of over 1.0 wt %, making the degree of drawing large also and thereby raising strength by work hardening, it would probably be possible to manufacture such a wire.

However, in practice there are many problems. First, there are manufacturing problems. That is, firstly, carbon steel wire rod material having a high carbon content is high in cost and the heat-treatment in manufacturing is also difficult. Secondly, also in the drawing process for making a steel wire, when a high strength (high hardness) material is drawn using a die the drawing force is high and wear of the die is severe and also it often tends to happen that drawing becomes impossible and the steel wire breaks. As a result, the desired steel wire cannot be obtained practically. Overcoming this problem is difficult.

The next problem is physical characteristics. That is, the characteristics of a steel wire are not satisfactory when it just has super high strength, and it must have good toughness at the same time. This is because steel wires, unlike sheets and bars, are placed under peculiar conditions such that not only do bending and pulling forces simply act on them but also when made into a steel cord they are twisted and subjected to complex and various forces such as tensile, compression and shearing forces while embedded in a rubber matrix. However, there have not been effective toughness parameters which take account of these kinds of conditions of use.

That is, conventionally, to determine the toughness of a steel wire, the steel wire has been twisted about its central axis and the number of turns (twist value) until the steel wire breaks has been taken as a measure of its toughness. However, with this kind of twist value it has not been possible to set a strict threshold between good and poor toughness, and it has not been reliable as a measure. The reason for this is that in practice it has been found many times that even among steel wires having the same twist value, in subsequent twisting performance and fatigue resistance and so on there are good ones and poor ones.

For belt reinforcement of radial tires for vehicles, for example tires for passenger cars, in consideration of maneuvering stability, steel cords of 1×4 structure or 1×5 structure made by twisting together four or five steel wires have been widely used.

However, steel cords of 1×4 structure or 1×5 structure generally have the kinds of cross-sectional shape shown in FIG. 9-A and FIG. 9-B, and have almost no gaps between the steel wires. Consequently, in a vulcanizing process after tire molding, rubber does not readily penetrate as far as the inside of the steel cord and spaces not filled with rubber exist in the length direction in the center of the steel cord.

As a result, when the tire is cut by stones and pieces of metal during travel, water penetrates through these cuts, water reaches the steel cord and also water passes into the space in the center of the steel cord. This causes rust to propagate in the length direction of the steel cord. As a result, the adhesion between the steel cord and the rubber matrix around it adhered together by vulcanization is destroyed, so-called separation occurs and consequently the life of the tire decreases markedly and also the problem arises that the functioning of the tire as a composite deteriorates greatly.

Furthermore, as described above, to reduce automobile fuel consumption, reductions in tire weight are being strongly demanded, and at the same time the demand for cost reductions has also been stronger. As measures for lowering tire weight, making steel cords stronger and reducing the amount of cord used per unit and lowering the diameter of the steel cord and reducing the amount of rubber covering this are effective. However, so far, as mentioned above, these measures have only made it possible to realize the practical use of steel wire of high strength in the range of $Y \geq -1960d+3577$ (N/mm²), and this has still been insufficient.

To reduce cost, reducing the number of steel wires constituting the steel cord to three is effective. However, when the steel cord structure is simply made a 1×3 structure, because it has the kind of cross-sectional shape shown in FIG. 9-C, problems of rubber penetration again arise. Moreover, to maintain the strength required of the steel cord it is necessary to make the steel wire diameter large, but when the steel wire diameter is made large its fatigue resistance with respect to bending decreases greatly due to the effect of filament diameter. Therefore, the steel wire constituting the steel cord must have extremely high strength and also good toughness, and hitherto there has not been a steel wire having these characteristics and it has not been possible to respond to the demands mentioned above.

SUMMARY OF THE INVENTION

Accordingly, a first object of the invention is to provide a super high tensile and high-toughness steel wire and a steel cord with which it is possible to realize suitable reductions in weight and increases in fatigue resistance of rubber products while keeping the carbon content at a conventional level.

A second object of the invention is to provide a steel cord for rubber product reinforcement having a simple structure which satisfies the first object of the invention and furthermore with which it is possible to efficiently achieve a strength equal to or greater than that of a conventional steel cord made up of four steel wires, which has excellent corrosion resistance, fatigue resistance and stiffness and which has excellent bending fatigue resistance even when the filament diameter is thick.

A third object of the invention is to provide a lightweight radial tire having a long life and superior maneuvering stability.

The invention provides a steel wire obtained by drawing to a predetermined intermediate diameter and then sequentially heat-treating and plating and drawing a carbon steel wire rod material containing 0.80 to 0.89 wt % carbon, characterized in that the tensile strength of the steel wire satisfies the expression below and the Vickers hardness distribution in a cross-section perpendicular to the length direction of the steel wire is substantially flat from the surface to the interior excluding a central portion corresponding to ¼ of the wire diameter.

$$Y \geq -1960d + 3920$$

wherein Y=tensile strength (N/mm$^2$), d: steel wire diameter (mm). This enables the attainment of the above-described first object of the invention.

The Vickers hardness distribution being substantially flat preferably means that it is in a range of within Hv30.

Also, the invention provides a steel wire characterized in that in addition to the Vickers hardness distribution being substantially flat the torque decrease factor is less than 7% in a torsion-torque test after pretorsion in the opposite direction.

Also, the invention provides a steel cord made by twisting together a plurality of the steel wires described above with a bunching-type twisting machine wherein each of the steel wires constituting the steel cord in this state satisfies the above-mentioned Vickers hardness distribution condition or this and the above-mentioned torque decrease factor characteristic in a torsion-torque test after pretorsion in the opposite direction.

Preferably, the Vickers hardness distribution characteristic and the torsion-torque test torque decrease factor characteristic mentioned above are satisfied not only in the steel cord on its own but also after rubber vulcanization by heating at a predetermined temperature for a predetermined time to make the composite comprising the steel cord and rubber.

Preferably, the steel wire is manufactured under the following wet drawing conditions:

[1] a drawing die whose approach angle 2α is 8° to 10° and whose bearing length is 0.3d$_1$ (where d$_1$ is the drawing hole diameter) is used;

[2] final drawing is carried out using a double die comprising two dies lined up in series and a skin pass of drawing area reduction 1.2 to 3.9% is carried out by the exit side die;

[3] drawing dies having sintered diamond nibs are used for the final drawing die and at least one drawing die upstream thereof; and

[4] the steel wire temperature immediately after passing through the final drawing die is controlled to below 150° C.

The invention is also characterized in that in a steel cord made up of three filaments a structure is adopted wherein steel wires of the invention as set forth for achieving the first object are used and twisted together so that two steel wires are bundled together substantially in parallel and one steel wire is wound around these in a spiral at a pitch of 45 to 65 times the wire diameter.

The invention is also characterized in that the above-mentioned steel cord is used as a reinforcing material and particularly to reinforce a belt layer of a radial tire. In this manner the third object of the invention is attained.

Because the invention uses a carbon steel wire rod material of carbon content 0.80 to 0.89 wt % already in general use, in this respect the invention does not result in increases in manufacturing cost.

Also, because a steel wire of the invention has a super high strength such that its tensile strength $Y \geq -1960d + 3920$ (N/mm$^2$), it is possible to realize a good reinforcing effect with a small number of filaments. The upper limit of the strength level of a steel wire of the invention, for reasons related to the carbon content being 0.80 to 0.89 wt %, is likely to be of the level $-1960d + 4214$.

Furthermore, in this invention, the Vickers hardness distribution in a cross-section perpendicular to the length direction of the steel wire is substantially flat from the surface to the interior excluding a central portion corresponding to ¼ of the wire diameter. As a result, the steel wire has good toughness. Moreover, as a parameter for determining this toughness, it has been discovered that a torsion-torque test based on forward twisting followed by reverse twisting is suitable, and this was employed. According to this, when the Vickers hardness distribution is substantially flat as described above, the torque decrease factor in the above-mentioned torsion test is under 7%.

As a result, according to this invention, a super high tensile steel wire having both super high strength and toughness at the same time and also having good twisting efficiency and good fatigue resistance can be obtained. Also, a steel cord made by twisting together a plurality of such steel wires has high strength, high toughness and excellent fatigue resistance, and by using such a steel cord as a rubber product reinforcing material it is possible to realize cost reductions and reductions in weight.

According to the invention, the number of steel wires in a steel cord is three, and even though the number of wires is reduced from the conventional four or five, because it is possible to reduce the degree of working by making the diameter of the steel wires large, the manufacturing cost is reduced. Furthermore, because a 2+1 structure is used, there are gaps between the steel wires, rubber penetrates into the cord well through these gaps and as a result the separation resistance is excellent. Also, because the two steel wires constituting the bundle are substantially parallel, there is little strength reduction of the kind occurring when steel wires are twisted together into a cord. Because one steel wire is wound on these in a spiral at a long pitch of 45 to 65 times the steel wire diameter, the strength utilization of this steel wire is also high. Therefore, a high steel cord strength is obtained.

Furthermore, the steel wires constituting the cord are of a high strength such that their tensile strength $Y \geq -1960d + 3920$ (N/mm$^2$). In addition, the Vickers hardness distribution in a cross-section perpendicular to the length direction of the steel wire is substantially flat from the surface to the interior excluding a central portion corresponding to ¼ of the wire diameter. Also, the torque decrease factor is less than 7% in a torsion-torque test after pretorsion in the opposite direction. As a result, each of the steel wires itself has excellent toughness, and the strength reduction of the steel wires when made into a cord is low. As a result of this, together with the effect of the long winding pitch mentioned above, a high cord strength can be obtained and a practical steel cord of which there is little decrease in fatigue resistance when the diameter of the steel wires is made large can be made.

Specific representative details and preferred embodiments of the invention are shown below, but it will be apparent to a person skilled in the art that various changes and modifications can be made without deviating from the spirit or the scope of the invention.

BRIEF DESCRIPTION OF THE DRAWINGS

FIG. 2-B is a graph showing another example of a Vickers hardness distribution from the center to the surface in a cross-section of a conventional steel wire;

FIG. 2-C is a graph showing a Vickers hardness distribution from the center to the surface in a cross-section of a steel wire according to the invention;

FIG. 2-D is a graph showing another Vickers hardness distribution from the center to the surface in a cross-section of a steel wire according to the invention;

FIG. 3-B is a graph of a torsion-torque curve in a torsion-torque test after pretorsion in the opposite direction;

DESCRIPTION OF THE PREFERRED EMBODIMENTS

Figure 1:
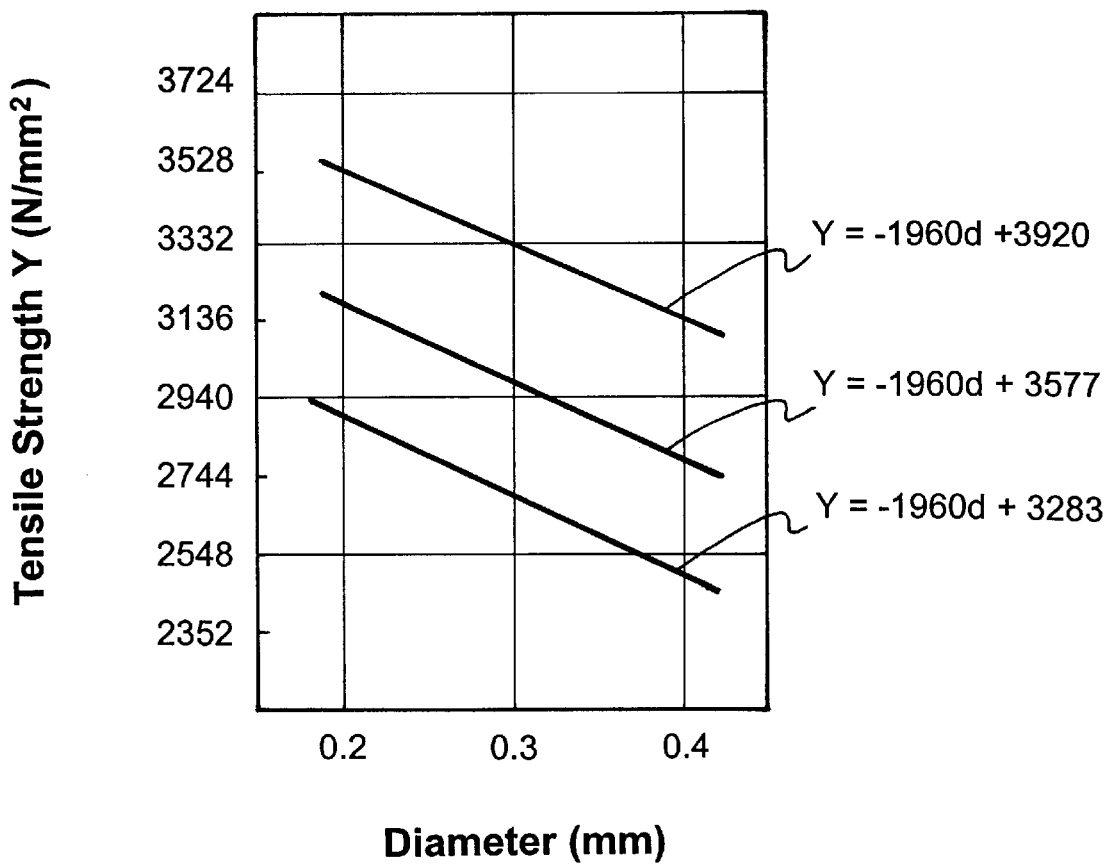
FIG. 1 is a graph showing relationships between steel wire diameter and tensile strength.
Figure 2A:
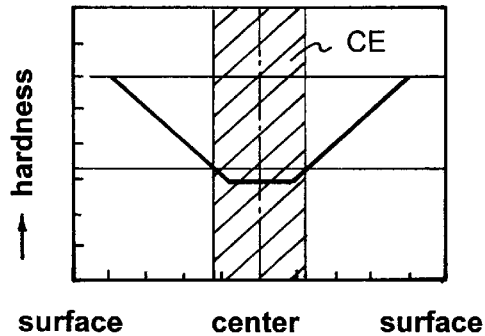
FIG. 2-A is a graph showing a Vickers hardness distribution from the center to the surface in a cross-section of a conventional steel wire.
Figure 2B:
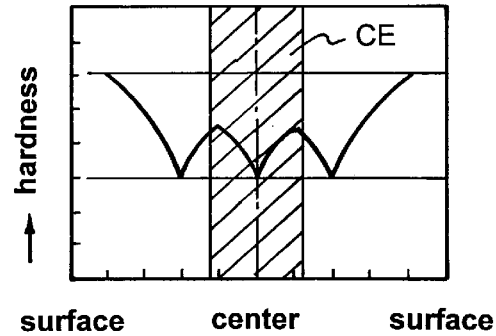
Figure 2C:
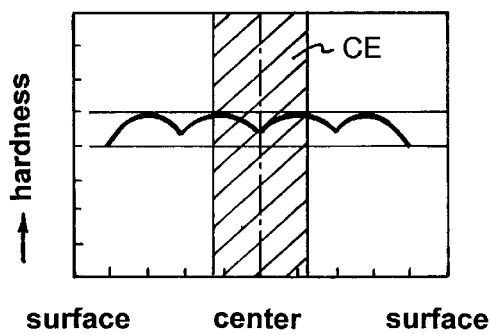
Figure 2D:
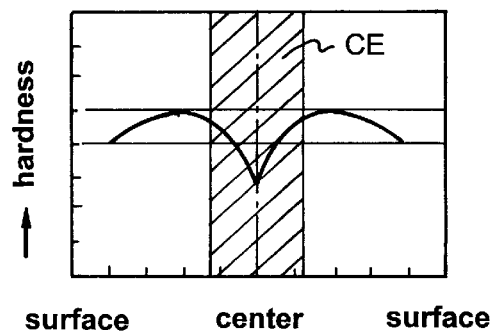

The invention will now be described in detail on the basis of the accompanying drawings.

First, a steel wire of the invention is one obtained by drawing to a predetermined intermediate diameter and then sequentially heat-treating and plating and drawing a carbon steel wire rod material containing 0.80 to 0.89 wt % carbon.

The reason for making the lower limit of the carbon content of the carbon steel wire rod material 0.80 wt % is that with a carbon content lower than this it is not possible to achieve tensile strength $Y \geq -1960d + 3920$ (N/mm$^2$) even when final drawing conditions of the kind described below are employed. The reason for making the upper limit of the carbon content 0.89 wt % is that with a carbon content greater than this there are the above-mentioned manufacturing aspect problems such as cost.

As a specific chemical composition, one example is a carbon steel consisting of C: 0.80 to 0.89 wt % and preferably 0.80 to 0.85 wt %, Si: 0.15 to 0.35 wt %, Mn: 0.3 to 0.9 wt % and a remainder of iron and unavoidable impurities. Predetermined amounts of Cr and Ni or the like may be added to this basic composition as alloying elements.

A carbon steel wire rod material of diameter 4.0 to 5.5 mm is used. After this is cleaned with acid and coated as usual, continuous wet drawing is carried out and an intermediate wire rod material for example of diameter 1.2 to 2.3 mm is obtained. This intermediate wire rod material is patenting-treated into a uniform, fine pearlite structure not including other structures such as bainite. Then, plating of a metal having good adherence with rubber is carried out on the surface of the intermediate wire rod material, heat treatment for diffusion is carried out and a plated final raw material wire is obtained. The plating is usually brass plating. Next, the final raw material wire is continuously wet-drawn to obtain a plated steel wire of a target diameter for example in the range 0.1 to 0.4 mm.

In the present invention, the Vickers hardness distribution in a cross-section perpendicular to the length direction in this steel wire is specified. That is, as shown in FIG. 2-C and FIG. 2-D, it is substantially flat from the surface to the interior excluding a central portion CE (the hatched area in each figure, corresponding to ¼ of the wire diameter).

In this invention, the reason it is specified that 'the Vickers hardness distribution is substantially flat' originates in the fact that because this Vickers hardness measuring method is by nature a measuring method with which there is a lot of dispersion of results it is difficult to quantify. However, generally, 'substantially flat' means that averages of Vickers hardness measurement values taken a certain number of times lie in a range of within Hv30 of each other.

The Vickers hardness distribution of a cross-section perpendicular to the length direction of the steel wire is uniform from the surface to the center in a heat-treatment step in making a super high tensile steel wire. As drawing is carried out this becomes a more complex distribution, and generally the Vickers hardness becomes greater at the surface than in the central portion. This is thought to be because during drawing through a die the flows of metal at the surface and on the inside differ.

In a steel wire drawn under ordinary wet drawing conditions, the Vickers hardness distribution of a cross-section perpendicular to the length direction is of the kind shown in FIG. 2-A and FIG. 2-B, and the width (in the figures, the vertical width) of the hardness distribution from the surface to the interior excluding the central portion CE (the hatched area) is extremely large.

When this kind of steel wire has actually been used to make a steel cord, breakage has occurred during twisting, and even when twisting has been possible many steel cords whose fatigue characteristics are unsatisfactory have appeared. This means that, although as a steel wire characteristic tensile strength has been obtained, toughness with respect to twisting has fallen.

It is for this reason that the present invention prescribes the Vickers hardness distribution in the way mentioned above. The difference between the Vickers hardness distributions of FIG. 2-C and FIG. 2-D is related to tensile strengths of steel wires. That is, the distribution shown in FIG. 2-C often appears at the level of the tensile strength and wire diameter relational expression Y≧−1960d+3577 (N/mm$^2$) and the distribution shown in FIG. 2-D often appears in the range of Y≧−1960d+3920 (N/mm$^2$).

The reason for this is that in the case of FIG. 2-D, even if a skin pass is conducted using a double die as the final drawing die to increase the degree of drawing, the uniformity of the Vickers hardness thereby obtained does not extend to the center of the wire. However, even with the distribution shape of FIG. 2-D, if the torque decrease factor is low in a torsion-torque test after pretorsion in the opposite direction which will be further discussed later, the toughness is actually good. That is, it can be said that if the Vickers hardness distribution is substantially uniform from the surface to the interior excluding a central portion corresponding to ¼ of the diameter, the target characteristics can be obtained. Of course, there is no strict boundary between FIG. 2-C and FIG. 2-D; they are in a mutually transitional relationship and if the wet drawing conditions change the distribution inclinations change.

Figure 3A:
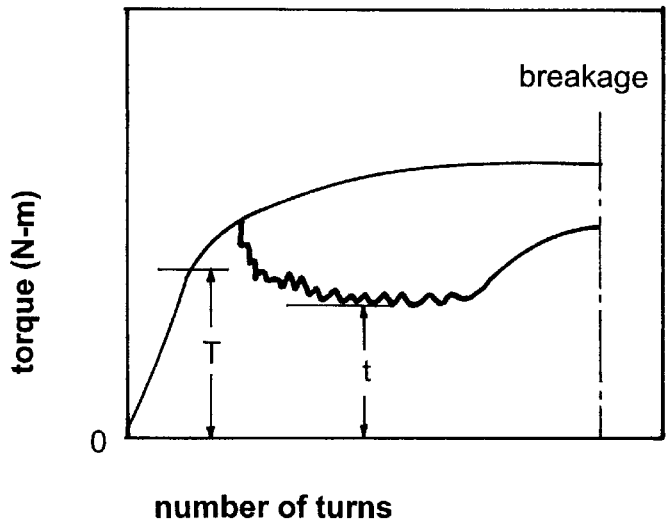
FIG. 3-A is a graph of a torsion-torque curve in a one-way torsion-torque test.
Figure 3B:
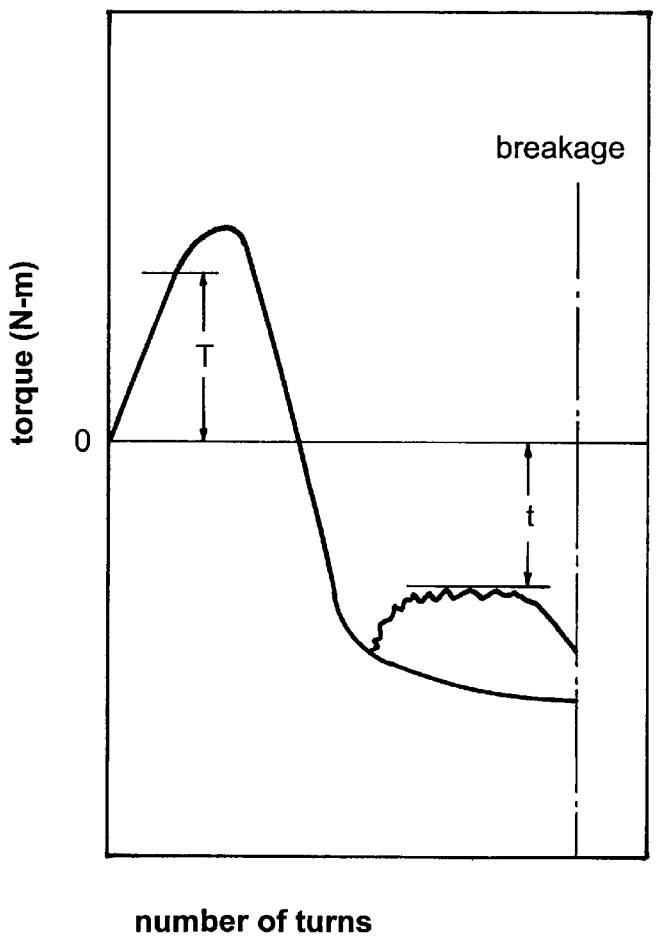

Also, the invention uses a steel wire having the characteristic, that when a torsion test based on forward twisting and reverse twisting is used, the torque decrease factor in this test is less than 7%. Generally, in a steel wire torsion test, a steel wire is gripped with a predetermined chuck spacing and while a tension is lightly applied in the axial direction of the wire the wire is twisted in a fixed direction and the number of turns until the steel wire breaks is taken as the twisting characteristic. FIG. 3-A shows torsion-torque curves obtained by this method.

However, a toughness determined by this method shows an extremely reduced standard only, and it can only serve to determine a reduction in toughness such that the wire cannot even be used as a twist wire.

Figure 4:
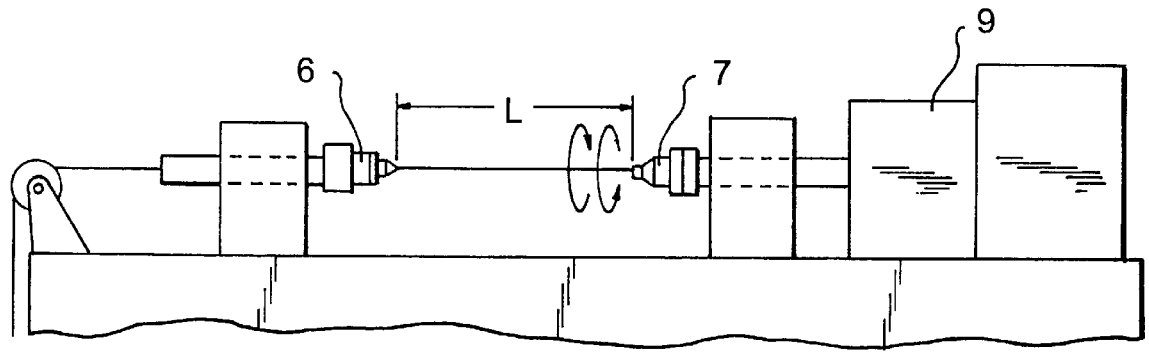
FIG. 4 is a view illustrating a torsion-torque test machine.

Accordingly, the present inventors have established a new toughness determination method and a standard based thereon. In a torsion-torque test according to the invention, as shown in FIG. 4, the chuck spacing L between a fixed side chuck 6 and a moving side chuck 7 is set to a predetermined size and a tension is lightly applied in the axial direction of the steel wire extending from the fixed side chuck 6 as shown with an arrow. In this state, the moving side chuck 7 is rotated by a variable speed, reversible motor 9 and the steel wire is thereby twisted at a predetermined twisting speed through a fixed number of turns in one direction. Here, the drive of the variable speed motor 9 is stopped and then twisting-back at the same twisting speed in reverse is carried out until the steel wire breaks and a continuous torsion-torque curve is taken. The torque decrease factor of this torsion-torque curve is then measured.

The torque decrease factor ΔT of this torsion-torque test using a forward-reverse twisting method, if in the torsion-torque curve of FIG. 3-B the torque value at the elastic limit of torsion in the initial forward twist, i.e. the upper limit of the linear portion rising to the right in the figure, is written T and the minimum value of the decreased part torque value in the reverse twisting is written t, is expressed by the following equation. When there is no torque decrease, t is made t=T.

$$\Delta T=[(T-|t|)/T]\times 100(\%)$$

When this torque decrease factor ΔT was measured for numerous steel wires, it was found that when the torque decrease factor ΔT was 8% or more there were problems. Accordingly, this invention prescribes steel wires showing the characteristic that the torque decrease factor ΔT is 7% or less to be of normal toughness.

Steel wires having a torque decrease factor ΔT 7% or less in this torsion-torque test after pretorsion in the opposite direction have high tensile strength, good fatigue resistance and can be certainly brought to a good state of twisting in a twisting process for obtaining a steel cord. Decrease of breaking strength due to twisting is also low and fatigue resistance is also good. When the Vickers hardness distribution of steel wires having this torque decrease factor ΔT is less than 7% was investigated, it was found to be substantially flat from the surface to the interior excluding a central portion corresponding to ¼ of the diameter.

Next, the invention includes a steel cord in which are used a plurality of steel wires of which the Vickers hardness distribution in a cross-section perpendicular to the length direction has the above-mentioned characteristic or this and in a torsion-torque test after pretorsion in the opposite direction the torque decrease factor ΔT is less than 7%.

The structure of this steel cord may for example be a 1×n typified by 1×3 and 1×4 structures, a (1×n)+m structure consisting of a plurality of steel wires twisted on the outside of a 1×n structure, or an n+m structure such as a 2+1, 1+2, 2+2 or 3+3 structure.

In this steel cord also, the steel wires constituting the steel cord must satisfy the Vickers hardness condition and the torque decrease factor condition discussed above.

Therefore, preferably, the steel cord is made by twisting with a bunching-type twisting machine. The Vickers hardness distribution of the wire cross-section of a steel cord obtained in this way becomes the same as or more uniform than that of the steel wire after drawing, and the torque decrease factor also becomes less than 7%. The reason for this is that because a bunching-type twisting machine twists the wires while twisting them together and their twisted form is made stable by a turn-back machine called an over-twister, in the process uniformity is promoted. On the other hand, when a steel cord is made using a tube-type twisting machine, because generally the steel wire is not turned and spiral-form embossing is carried out on the steel wire with a preformer, the Vickers hardness distribution of the wire cross-section of the steel cord often differs from the state of the wire after drawing and it also happens that the uniformity is not maintained. Therefore, a tube-type twisting machine cannot be said to be suitable.

Figure 7:
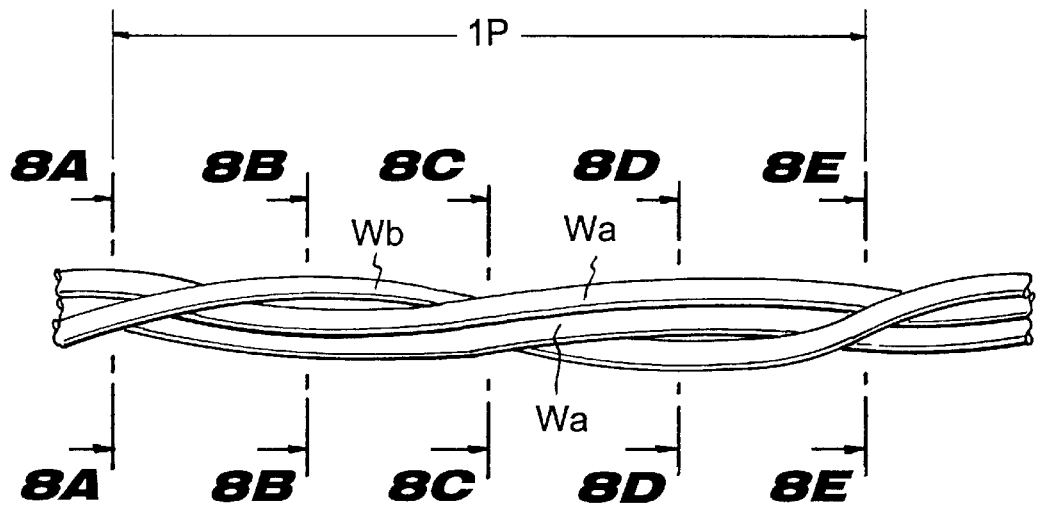
FIG. 7 is a detailed partial side view showing an example of a steel cord according to the invention.
Figure 8A:
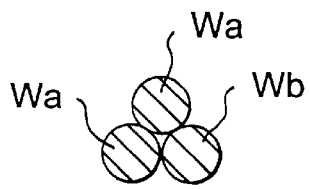
FIG. 8(A) to FIG. 8(E) are cross-sectional views of one pitch length of the steel cord of FIG. 7 cut at five locations.
Figure 8B:
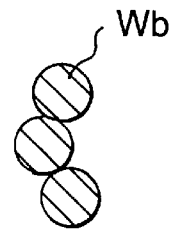
Figure 8C:
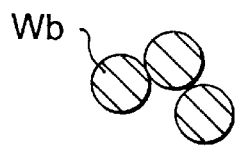
Figure 8D:
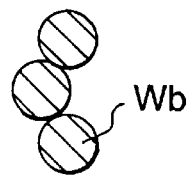
Figure 8E:
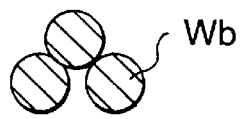

FIG. 7 and FIG. 8(1) to FIG. 8(5) show an example of a steel cord according to the invention twisted with a bunching-type twisting machine. This steel cord has a simple structure suited to satisfying demands for tire weight reduction and cost reduction, has excellent rubber penetration and stiffness and bending fatigue resistance and furthermore has a strength equal to or greater than that of a conventional 1×4 structure.

Wa, Wa and Wb are three steel wires of the same diameter selected from the range 0.22 to 0.35 mm and twisted together so that the two steel wires Wa, Wa are bundled substantially in parallel and the one steel wire Wb is wound around these in a spiral.

'Substantially parallel' is a concept including, besides cases wherein the two steel wires Wa, Wa are in continuous contact with each other, cases wherein within one pitch length there are portions suitably separated.

The winding pitch P of the steel wire Wb must be made within the range 45 to 65 times the steel wire diameter d. The reason for this is that when the winding pitch P is less than 45 times the steel wire diameter d the twisting efficiency may be low and the rubber penetration may be somewhat low, and with a large winding pitch exceeding 65 times the steel wire diameter d the steel cord has poor integrity and readily comes apart.

Figure 9A:
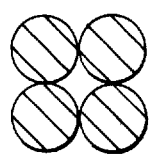
FIG. 9-A to FIG. 9-C are detailed cross-sectional views of conventional steel cords.
Figure 9B:
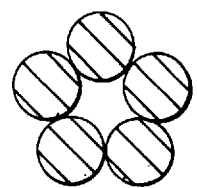
Figure 9C:
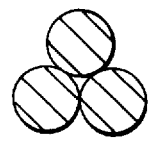

FIG. 8(1) to FIG. 8(5) schematically show cross-sectional shapes at locations dividing one pitch length of the above-mentioned steel cord is divided into five parts. When three steel wires are simply twisted together at once to make a steel cord of 1×3 structure, the cross-sectional shape thereof is as shown in FIG. 9-C and spaces where almost no rubber penetration takes place remain in the cord center; however, in a cord of this invention there are no closed-contour parts where the three steel wires are all adjacent. Therefore, the area of adhesion between the steel wires and the rubber is large, almost all the surfaces of the filaments of the cord can adhere to the rubber and the separation resistance of the cord is excellent.

Also, because the two steel wires Wa, Wa are substantially parallel, there is no strength decrease accompanying these steel wires being twisted into a cord and furthermore because the one steel wire Wb is given a large winding pitch within a range such that the cord does not come apart the strength utilization of this filament is high. For these reasons it is possible to obtain a steel cord of very high strength.

This steel cord can normally be made using a bunching-type twisting machine with two steel wires moving in parallel respectively pulled out from two bobbins disposed outside the twisting machine and one steel wire pulled out from one bobbin disposed inside the twisting machine.

Figure 10:
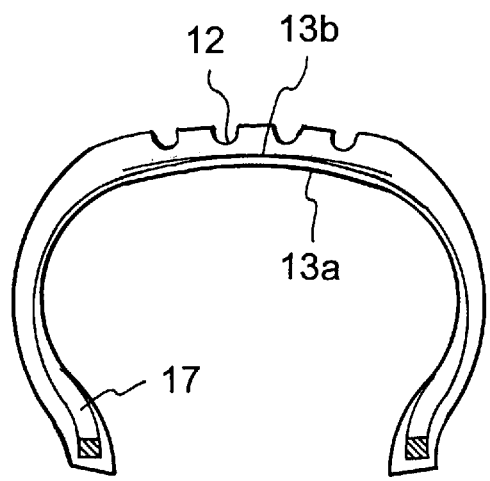
FIG. 10 is a cross-sectional view of a radial tire to which the invention has been applied.

In the case of a radial tire a steel cord made in this way is used for at least one of a plurality of belts 13a, 13b of an underlayer of a tread 12 as shown in FIG. 10, and multiple cords are disposed in parallel in a flat rubber matrix constituting the belt and composited therewith. Also, besides this, the steel cord can be used in the carcass 17. The steel cord shown in FIG. 7 and FIG. 8 is particularly suitable for use as a belt reinforcing material.

Even after this kind of rubber composite is used to make a tire and the rubber is vulcanized, the steel wires constituting the steel cord can satisfy the above-mentioned conditions of cross-sectional Vickers hardness distribution and torque decrease factor. That is, because ageing is accelerated by the heating of the vulcanization of the rubber, the average value of the Vickers hardness distribution increases, but it has the same inclinations as before the heating. This has been confirmed as a result of investigating the Vickers hardness distributions of wire cross-sections after heating a steel cord at 150° C. for 30 minutes.

A steel wire having Vickers hardness distribution and torque decrease factor characteristics according to the invention can be industrially manufactured stably by employing the following conditions in a continuous wet drawing process:

[1] A drawing die whose approach angle $2\alpha$ is 8° to 10° and whose bearing length is $0.3d_1$ (where $d_1$ is the drawing hole diameter) is used.

[2] Final drawing is carried out using a double die comprising two dies lined up in series and a light skin pass of area percentage reduction in the range 1.2 to 3.9% is carried out by the exit side die.

[3] Drawing dies having sintered diamond nibs are used at least for the two dies of the double die and from one to five drawing dies upstream thereof. Conventional alloy nibs may be used for the other dies.

[4] The temperature of the wire immediately after passing through the final drawing die is controlled to below 150° C. by keeping the lubricating liquid temperature low.

These conditions will now be explained in more detail.

Figure 5:
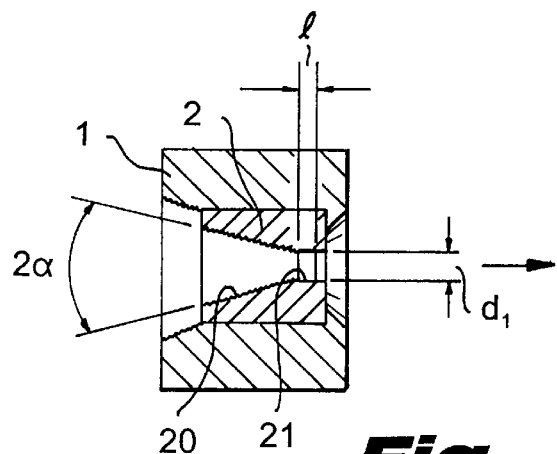
FIG. 5 is a cross-sectional view of a drawing die used in the manufacture of a steel wire according to the invention.

FIG. 5 shows a drawing die (including a double die for final drawing which will be further discussed later) used in a wet drawing process, wherein a die 1 contains a nib 2, the approach angle $2\alpha$ of an approach part 20 of the nib 2 is 8° to 10° and the length l of a bearing part 21 of the nib 2 is $0.3d_1$.

Conventionally, an approach angle of 12° is generally employed because this results in the lowest drawing force. In this invention, because rather than this it is more important that the surface and the inside of the wire receive uniform working and the residual stress of the wire surface is low, the approach angle is made 8° to 10°. The bearing length is made short to suppress the increase in drawing resistance, because a normal bearing length of $0.5d_1$ results in too much drawing resistance and is therefore not suitable.

Figure 6:
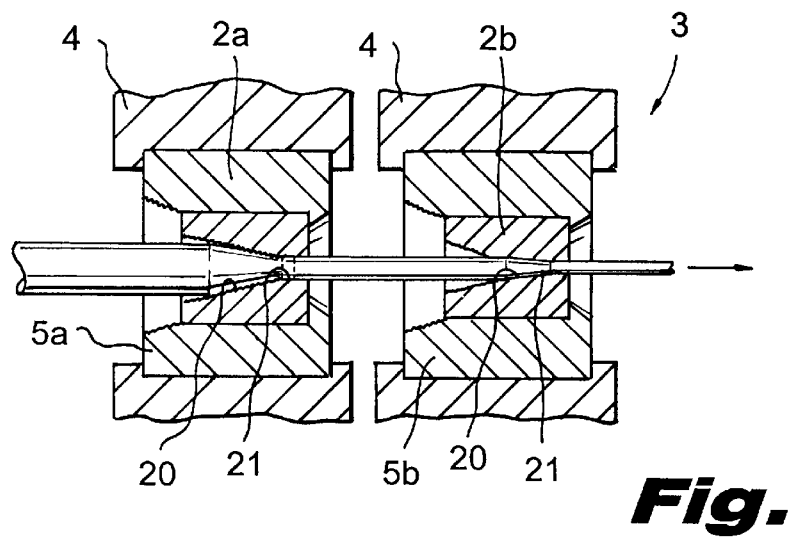
FIG. 6 is a cross-sectional view of a final drawing die used in the manufacture of a steel wire according to the invention.

FIG. 6 shows a double die (finishing die) 3 for final drawing wherein a normal die 5a and a skin pass die 5b are disposed adjacent to each other in series in casings 4, 4, and a predetermined area percentage reduction is thereby obtained in two stages. Nibs 2a, 2b of the normal die 5a and the skin pass die 5b are each made of sintered diamond and have the above-mentioned approach angle and bearing length.

Sintered diamond nibs are used in at least three and preferably four to six dies including the two nibs 2a, 2b of the double die 3 and the drawing die upstream of these for the following reasons: Firstly, because the surface roughness of sintered diamond is very smooth compared with that of an alloy die it is possible to reduce the drawing force and also the surface of the drawn wire also becomes smooth and there is an effect of increasing the fatigue resistance. Secondly, because sintered diamond is hard there is almost no wear caused by continuous drawing and increase of die diameter caused by wear and consequent changes in the area percentage reduction can be prevented.

Next, the reason for using a double die as the final drawing die to carry out a skin pass is to reduce wire heating caused by drawing and keep the residual stress of the wire surface low. The drawing area percentage reduction of the skin pass die 5b is made in the range 1.2 to 3.9% because when it is less than 1.1% the amount of working is too small and there is no residual stress moderating action and also when it is too large, at over 4.0%, the residual stress moderating action is small.

The lubricating liquid temperature is kept low so that the temperature of the wire immediately after passing through the final drawing die is below 150° C. This is because by keeping the wire temperature immediately after passing through the final drawing die below a fixed value by controlling the temperature of the lubricating liquid along with employing a skin pass there is the advantage that it is possible to prevent brittling of the steel wire caused by ageing.

As the method for keeping the lubricating liquid temperature low, it is sufficient if a pump and a cooler are provided outside a wet drawing machine comprising a set of drawing dies disposed inside a tank, a circulating system which forcibly removes lubricating liquid filled around the set of drawing dies from the tank at a suitable rate and returns this lubricating liquid to the tank after it is cooled by the cooler is constructed and the temperature of the lubricating liquid is thereby controlled to for example below 35° C. during running.

EXAMPLES

Preferred embodiments of the invention will now be presented.

First Preferred Embodiment

1) As a raw material, a carbon steel wire rod material of diameter 5.5 mm was used. The composition thereof, by weight percentage, was C: 0.84%, Si: 0.21%, Mn: 0.51% and a remainder of iron and unavoidable impurities. This wire rod material was continuously wet drawn into wires (intermediate wire rod materials) of intermediate diameters 2.2 mm and 2.0 mm.

2) Next, heat-treatment (patenting) and brass plating were carried out on these wires to produce final raw material wires. The tensile strength of the wires at this time was 1245N/mm$^2$ in the case of the intermediate diameter 2.20 mm and 1264N/mm$^2$ in the case of the intermediate diameter 2.0 mm.

3) Then, continuous wet drawing was carried out and 0.35 mm diameter steel wires of Samples 1 to 9 were obtained.

In this wet drawing, the steel wires were made under the following conditions:

Samples 1, 2 and Samples 5 to 7 were of intermediate diameter 2.0 mm and Sample 3 was of intermediate diameter 2.2 mm. A Sample 9 was of intermediate diameter 1.8 mm.

Explaining slightly further, Samples 1, 3 and 7 were made using sintered diamond nibs for the two dies of the double die and the four dies immediately before the double die (six dies in total), and alloy dies were used for the dies upstream of these. Samples 2, 5 and 6 were made using sintered diamond nibs for the two dies of the double die and the two dies immediately before them.

Sample 7 was made using an ordinary single pass without carrying out a skin pass. Sample 9 was made using alloy dies for all the dies.

4) Also, as a raw material, a carbon steel wire rod material of diameter 5.5 mm was used. The composition thereof, by wt %, was C: 0.88%, Si: 0.24%, Mn: 0.51% and a remainder of iron and unavoidable impurities. This wire rod material was continuously wet drawn into a wire (intermediate wire rod material) of intermediate diameter 2.0 mm.

Next, heat-treatment and brass plating were carried out on this wire to produce a final raw material. The tensile strength of the wire at this time was 1313N/mm$^2$. Then, continuous wet drawing was carried out and 0.35 mm diameter steel wires of a Sample 4 and a Sample 8 were obtained.

Sample 4 was made using sintered diamond nibs for the two dies of the double die and the two dies immediately before these. Sample 8 was made without carrying out a skin pass and using sintered diamond nibs for the two dies of the double die and the four dies immediately before them (six dies in total).

5) For the above-mentioned Samples 1 to 9, the wet drawing conditions and the characteristics of the steel wires obtained are shown in Table 1.

In Table 1, and in Tables 2 and 5, which will be further discussed later, the 'Final Filament Temperature' means the steel wire temperature immediately after passing through the final die, and the figures are temperatures measured with a running filament temperature measuring instrument.

In Table 1 (and also in Tables 2 and 5, which will be further discussed later), the 'Twist Value' is the measured number of turns until the wire breaks when the chuck spacing L between the fixed side chuck 6 and the moving side chuck 7 in FIG. 4 is made 100d (d is the wire diameter), the steel wire 8 of the sample is gripped in the chucks and while a tension is lightly applied in the axial direction of the wire extending from the fixed side chuck 6 the moving side chuck 7 is turned by the motor 9 at 30 rpm to twist the wire in one direction.

In Table 1 (and also in Tables 2 to 10), the 'Vickers Hardness Distribution Shape' is a determination of which of the types of hardness distribution shown in FIG. 2-A to FIG. 2-D the shape obtained by carrying out five measurements at each of five locations from the center to the surface along a line passing through the center of the wire cross-section of the steel wire of the respective sample (including both sides, ten locations) and plotting average values for each location is most like. In the Table, A indicates the shape shown in FIG. 2-A, B the shape shown in FIG. 2-B, C the shape shown in FIG. 2-C and D the shape shown in FIG. 2-D.

In the torsion-torque test, the chuck spacing L between the fixed side chuck 6 and the moving side chuck 7 was made 300d (d being the wire diameter), and while a tension was lightly applied in the axial direction of the wire extending from the fixed side chuck 6 the moving side chuck 7 was turned by the motor 9 at 30 rpm through ten turns in one direction, stopped, and then twist-back was carried out by turning at the same twisting speed in the opposite direction until the steel wire broke, the torsion-torque curve was taken and a determination was made from this.

In Table 1 (and also in Tables 2 to 10, which will be further discussed later), a O under 'Forward-Reverse Torsion-Torque Test Result' indicates that the torque decrease factor $\Delta T$ is 0 to 7% (good) and a x indicates that the torque decrease factor $\Delta T$ was over 8% (not good).

The wire fatigue limit was obtained using a Hunter rotary bending fatigue test machine.

As is clear from this Table 1, Samples 1, 2, 3 and 4 accord to the conditions of the present invention; they have the target tensile strength, their Vickers hardness distributions are substantially flat and also their torque decrease factors in the torsion-torque test are good and their fatigue limits are also very good compared to a conventional high tensile material (Sample 9).

Samples 5 to 8 are all comparison examples, and in each case the Vickers hardness distribution is not flat and there is a torsion-torque problem. As a result, their fatigue limits are also not improved compared to Sample 9, which is a conventional example.

Second Preferred Embodiment

1) As a raw material, a carbon steel wire rod material of diameter 5.5 mm was used. The composition thereof, by weight percentage, was C: 0.82%, Si: 0.20%, Mn: 0.53% and a remainder of iron and unavoidable impurities. This wire rod material was continuously wet drawn into a wire of intermediate diameter 1.43 mm.

Next, heat-treatment and brass plating were carried out on this wire to produce a final raw material. The tensile strength of the wire at this time was 1333N/mm$^2$. Then, continuous wet drawing was carried out and 0.20 mm diameter steel wires were obtained. In this wet drawing the conditions were changed to make steel wires of Samples 10 to 14.

2) Sample 10 was made using sintered diamond nibs in all the dies. Samples 11 and 12 were made using sintered diamond nibs in the two dies of the double die and the two dies immediately before them, four dies in total, and using alloy dies for the dies before those. Samples 13 and 14 were made using sintered diamond nibs in the two dies of the double die and the four dies immediately before them, six dies in total, and using alloy dies for the dies before those. Sample 15 was made using alloy dies for all the dies.

The manufacturing conditions and characteristics of these Samples 10 to 15 are shown in Table 2.

3) As is clear from Table 2, Samples 10 and 11, which are embodiments of the present invention, have the target tensile strength, also have good toughness and also have fatigue limits higher than that of Sample 15 (intermediate diameter 1.1 mm), which is a conventional example. On the other hand, in Samples 12 to 14, which are comparison examples, it can be seen that although their strength is sufficient their fatigue limits are hardly improved compared to the conventional example.

Third Preferred Embodiment

1) Steel cords were made by twisting together 0.35 mm diameter steel wires of the first preferred embodiment and 0.20 mm diameter steel wires of the second preferred embodiment with a bunching-type twisting machine.

That is, a steel cord of 1×3 (0.20) +6 (0.35) structure (twisting pitches 1×30: 10 mm, +6: 18 mm) was made by twisting together three 0.20 mm diameter steel wires in an S direction to form a core of 1×3 structure and twisting six 0.35 mm steel wires around this in the S direction. These were made Samples 16 to 23.

2) The steel wires used in these steel cords were as follows. In the following, 'core' means core wires and 'outer' means outer wires.

Sample 16 . . . core: Sample 10 wire, outer: Sample 1 wire
Sample 17 . . . core: Sample 11 wire, outer: Sample 2 wire
Sample 18 . . . core: Sample 11 wire, outer: Sample 3 wire
Sample 19 . . . core: Sample 11 wire, outer: Sample 4 wire
Sample 20 . . . core: Sample 12 wire, outer: Sample 5 wire
Sample 21 . . . core: Sample 13 wire, outer: Sample 6 wire
Sample 22 . . . core: Sample 14 wire, outer: Sample 8 wire
Sample 23 . . . core: Sample 15 wire, outer: Sample 9 wire The characteristics of these steel cords are shown in Table 3.

In Table 3 (and also in Table 4 and Tables 6 to 10, which will be further discussed later), the 'Twisting Efficiency' is the value of the actual strength of the cord divided by the sum of the strengths of the steel wires before they were twisted together multiplied by 100.

Also, in Table 3 (and also in Table 4 and Tables 6 to 10), the 'Fatigue Resistance' is the result of a test wherein three rotatable rolls having predetermined diameters are disposed in a zigzag, the steel cord is threaded through the rolls under a load of 10% of the cord breaking load, these rolls are repeatedly moved to the left and right to apply repeated bending to the cord and the number of repetitions until the cord breaks is measured. The figures in the Table are based on a conventional example being made 100.

In Table 3 (and also in Table 4 and Tables 6 to 10), a ⊙ under 'Twisting Performance' indicates no breakage, a Δ indicates breakage and a x indicates numerous breakages.

Fourth Preferred Embodiment

Using the steel wires of Samples 1 and 3, Samples 5 and 6 and Sample 9 and using a bunching-type twisting machine, steel cords of 2+2 structure were made by pulling together two steel wires (wires) substantially in parallel and winding another two steel wires around these in an S direction at a pitch of 18 mm, and Samples 24 to 28 were thereby obtained.

The characteristics of these steel cords are shown in Table 4.

As is clear from Table 3 and Table 4, with Samples 16 to 19 and 24 and 25, which are embodiments of the invention, there were no twisting problems, strength decrease caused by twisting was low, the breaking load was maintained amply high (the twisting efficiency was high) and the fatigue resistance was also very high.

In Samples 20 to 22 and 26 and 27, on the other hand, which are comparison examples, because steel wires of which the Vickers hardness distribution is not substantially flat and the twisting torque is poor are used for the cords, not only is the twisting efficiency much lower but also the fatigue resistance is poor.

The forward-reverse torsion test results in Tables 3, 4 are results obtained when the steel cords were taken apart and the steel wires were taken out and the torsion test was carried out on these steel wires.

Fifth Preferred Embodiment

Using the final raw material of Sample 3, continuous wet drawing was carried out and 0.38 mm diameter steel wires of Samples 29 to 31 were obtained. Samples 29 to 31 were drawn using sintered diamond nibs in the two dies of the double die and the two dies immediately before these, and using alloy dies for the dies upstream of these. A Sample 32 was drawn using a conventional final raw material and using alloy dies for all the dies.

The characteristics of these wires are shown in Table 5.

Sixth Preferred Embodiment

1) Steel cords were made by twisting together 0.38 mm wires of the fifth preferred embodiment and 0.20 mm wires of the second preferred embodiment with a bunching-type twisting machine.

That is, three steel wires of diameter 0.20 mm were twisted in a Z direction to make a 1×3 core and six 0.38 mm diameter steel wires were further twisted onto this in an S direction to make steel cords of 1×3 (0.20) +6 (0.38) structure (twisting pitches 1×30: 10.0 mm, +6: 18.0 mm). These were made Samples 33 to 36.

2) The steel wires used in these steel cords were as follows. In the following, 'core' means core wires and 'outer' means outer wires.

Sample 33 . . . core: Sample 10 wire, outer: Sample 29 wire
Sample 34 . . . core: Sample 10 wire, outer: Sample 30 wire
Sample 35 . . . core: Sample 13 wire, outer: Sample 31 wire
Sample 36 . . . core: Sample 15 wire, outer: Sample 32 wire The characteristics of these steel cords are shown in Table 6.

From this Table 5 and Table 6 also, it can be seen that in Samples 29, 30, 33 and 34, which are embodiments of the invention, because the Vickers hardness distribution in the cross-section of the wire and the forward-reverse torsion-torque test result are good, good characteristics of twisting performance, strength, fatigue resistance and twisting efficiency are obtained.

Seventh Preferred Embodiment

1) As a raw material, a carbon steel wire rod material consisting of, by weight percentage, C: 0.84, Si: 0.21, Mn: 0.53 and a remainder of iron and unavoidable impurities was used. This wire rod material was continuously drawn to a predetermined intermediate diameter. This was then heat-treated so as to become of a fine pearlite structure, for adhesion to rubber by vulcanization brass plating of a predetermined composition was carried out whereby a final raw material produced, and this raw material was wet drawn to make a super high tensile steel wire of diameter 0.28 mm. Using this steel wire, a steel cord was made with a bunching-type twisting machine.

2) In the making of the steel wire, in the final wet drawing the final die was made a double die and the skin pass area percentage reduction thereof was made 2.5%. Also, diamond nibs were used in the two dies of the double die and one die upstream thereof, and conventional alloy dies were used for the other dies. The approach angle ($2\alpha$) of all the dies used was made 10° and the bearing length was made $0.3d_1$. The final surface temperature of the steel wire was made 139° C.

3) Three steel wires were twisted together into a 2+1 steel cord. At this time, the winding pitch of one wound steel wire was taken at five levels and Samples 37 to 41 were obtained. Also, a Sample 43 was obtained using a conventional high tensile steel wire of the same diameter.

A Sample 42 is a steel cord using steel wires made without using a double die and simply using diamond nibs in the final two dies and otherwise under the same conditions as Samples 37 and 38.

Also, using the same steel wire as in Samples 37 to 39 a steel cord of 1×3 structure was made as Sample 44, and a conventional high tensile material of 1×4 structure was made as Sample 45.

The characteristics of these are shown in Table 7.

Eighth Preferred Embodiment

As a raw material, a carbon steel wire rod material consisting of, by weight percentage, C: 0.82, Si: 0.20, Mn: 0.51 and a remainder of iron and unavoidable impurities was used, a steel wire of diameter 0.23 mm (the final surface temperature being 135° C.) was made under the same conditions as Sample 37 and a steel cord was obtained using this steel wire.

These were respectively made Samples 46 to 48. Also, using the same steel wire a cord of structure 1×3 was made as Sample 51.

Furthermore, as Sample 49 a steel cord was made in the same way as in the seventh preferred embodiment, without skin pass drawing, and a steel cord using a conventional high tensile material was made Sample 50.

The characteristics of these are shown in Table 8.

Ninth Preferred Embodiment

A super high tensile steel wire of diameter 0.32 mm and a steel cord were made using the same material as in the seventh preferred embodiment, as Sample 52. Using the same steel wire a cord of 1×3 structure was made as Sample 53. Also, a conventional high tensile steel wire of diameter 0.30 mm and a steel cord of 1×4 structure using this were made as Sample 54.

The characteristics of these are shown in Table 9.

Tenth Preferred Embodiment

As a raw material a carbon steel wire rod material consisting of, by weight percentage, C: 0.87, Si: 0.23, Mn: 0.50 and a remainder of iron and unavoidable impurities was used and a steel wire of diameter 0.35 mm and a cord were made under the same conditions as in the seventh to ninth preferred embodiments as Sample 55.

Also, using the same steel wire a steel cord of 1×3 structure was made as Sample 56. The characteristics of these are shown in Table 10.

In Table 7 through Table 10, the 'Bending Stiffness Index' is a size of bending moment required to bend a cord sample of length 70 mm through a fixed angle and its value is determined with relation to the bending index in Table 7 Sample 45, in Table 8 Sample 51, in Table 9 Sample 54 and in Table 10 Sample 56 respectively taken as 100.

The 'Rubber Penetration' was determined by vulcanizing a steel cord made in straight line form in rubber, breaking up the steel cord in its length direction and observing the degree of rubber penetration visually, with a cord wherein the whole periphery of the steel wires constituting the steel cord is covered in rubber being taken as 100%.

As is clear from FIG. 7 and FIG. 8, the steel wires of Samples 37 to 39, which are embodiments of the invention, have the target strength and have good toughness and also, because they have correct winding pitches, the balance of strength, fatigue resistance, bending stiffness, twisting efficiency and rubber penetration of the steel cords is good.

On the other hand, in Samples 40 and 41, which are comparison examples, although the steel wires themselves are suitable, because the winding pitch is outside the range prescribed by the invention, the twisting efficiency and the rubber penetration are poor, the cords easily come apart and the characteristics are therefore unsatisfactory. In sample 42, which is a comparison example, because the die conditions in the wet drawing process are not suitable, the characteristics of twisting efficiency and fatigue resistance are not satisfactory. In Sample 43, which is a comparison example, although the toughness is good the tensile strength of the steel wire is inadequate and consequently characteristics such as the cord strength and fatigue resistance are unsatisfactory. In Sample 44, which is a comparison example, because the cord structure is not suitable, particularly the rubber penetration is poor.

Also, as is clear from Table 8, even when the steel wire diameters are different, Samples 46 and 47, which are embodiments of the invention, have a good balance of all the characteristics of strength, fatigue resistance, bending stiffness, twisting efficiency and rubber penetration. Sample 48, on the other hand, of which the winding pitch is outside the range prescribed by the invention (is too large), comes apart easily and is not suitable. In sample 49, in the drawing of which a skin pass was not carried out, the characteristics of the steel wire are deficient and also when made into a steel cord characteristics thereof such as the twisting efficiency and fatigue resistance are unsatisfactory.

Sample 50, wherein a steel wire having a tensile strength outside the scope of the invention was used, although its toughness and twisting pitch were suitable, was inferior in its cord strength and fatigue resistance characteristics. In sample 51, because the cord structure is 1×3, although the characteristics of the steel wire were good the rubber penetration in particular was inferior.

As is clear from Table 9, in Sample 52, wherein the steel wire was made thick in diameter, the balance of the strength, fatigue resistance, bending stiffness, twisting efficiency and rubber penetration of the steel cord was good. In Sample 53, on the other hand, although suitable steel wire was used, because the cord structure was unsuitable the rubber penetration was inferior. In sample 54, which is a conventional example, the cord strength and the rubber penetration are inferior.

As is clear from Table 10, in Sample 55, wherein the steel wire was made even thicker in diameter, there was a balance among all the aspects of strength, fatigue resistance, bending stiffness, twisting efficiency and rubber penetration of the steel cord. In Sample 56, on the other hand, because the cord structure was not suitable, the rubber penetration was inferior.

TABLE 1

| Characteristic | Sample 1 | Sample 2 | Sample 3 | Sample 4 | Sample 5 | Sample 6 | Sample 7 | Sample 8 | Sample 9 |
|---|---|---|---|---|---|---|---|---|---|
| Tensile Strength (N/mm$^2$) | 3420 | 3371 | 3489 | 3459 | 3342 | 3401 | 3332 | 3469 | 3858 |
| Twist Value (turns/100 d) | 39 | 35 | 34 | 37 | 28 | 29 | 26 | 25 | 33 |
| Vickers Hardness Distribution Shape | C | C | D | D | B | B | B | B | A |
| Forward-Reverse Torsion Test Result | ◯ | ◯ | ◯ | ◯ | X | X | X | ◯ | ◯ |
| Fatigue Limit (N/mm$^2$) | 1078 | 1078 | 1078 | 1078 | 882 | 931 | 882 | 931 | 833 |
| *1 | | | | | | | | | |
| Die Approach Angle (2 α°) | 8 | 10 | 10 | 10 | 10 | 10 | 8 | 10 | 12 |
| Die Bearing Length | 0.3 d$_1$ | 0.3 d$_1$ | 0.3 d$_1$ | 0.3 d$_1$ | 0.3 d$_1$ | 0.3 d$_1$ | 0.3 d$_1$ | 0.3 d$_1$ | 0.5 d$_1$ |
| Skin Pass Area Reduction (%) | 2.0 | 2.5 | 2.0 | 2.0 | 1.0 | 4.5 | — | — | — |
| Final Filament Temperature (°C.) | 147 | 142 | 148 | 145 | 153 | 143 | 187 | 181 | — |
| Number of Doamond Dies Used | 6 | 4 | 6 | 4 | 4 | 4 | 6 | 6 | 0 |

*1: Final Wet Drawing Conditions

TABLE 2

| Characteristic | Sample 10 | Sample 11 | Sample 12 | Sample 13 | Sample 14 | Sample 15 |
|---|---|---|---|---|---|---|
| Tensile Strength (N/mm$^2$) | 3695 | 3675 | 3675 | 3714 | 3724 | 3254 |
| Twist Value (turns/100 d) | 44 | 48 | 32 | 43 | 30 | 42 |
| Vickers Hardness Distribution Shape | D | D | B | B | B | A |
| Forward-Reverse Torsion Test Result | ◯ | ◯ | X | X | X | ◯ |
| Fatigue Limit (N/mm$^2$) | 1323 | 1372 | 1078 | 1127 | 1078 | 1078 |
| *1 | | | | | | |
| Die Approach Angle (2 α°) | 8 | 10 | 10 | 8 | 8 | 12 |
| Die Bearing Length | 0.3 d$_1$ | 0.3 d$_1$ | 0.5 d$_1$ | 0.5 d$_1$ | 0.3 d$_1$ | 0.5 d$_1$ |
| Skin Pass Area Reduction (%) | 2.0 | 1.5 | 4.5 | 2.0 | — | — |
| Final Filament Temperature (°C.) | 135 | 130 | 138 | 140 | 174 | — |
| Number of Doamond Dies Used | all dies | 4 | 4 | 6 | 6 | 0 |

*1: Final Wet Drawing Conditions

TABLE 3

| Characteristic | Sample 16 | Sample 17 | Sample 18 | Sample 19 | Sample 20 | Sample 21 | Sample 22 | Sample 23 |
|---|---|---|---|---|---|---|---|---|
| Twisting Performance | ⊙ | ⊙ | ⊙ | ⊙ | X | Δ | X | ⊙ |
| Breaking Load N | 2195 | 2156 | 2225 | 2225 | 2058 | 2117 | 2048 | 1931 |
| Fatigue Resistance | 135 | 130 | 131 | 137 | 94 | 106 | 90 | 100 |
| Twisting Efficiency (%) | 94.5 | 94.0 | 94.2 | 94.9 | 90.4 | 91.7 | 87.0 | 93.2 |
| *2 | C | C | C | C | A | A | B | A |
| *3 | ◯ | ◯ | ◯ | ◯ | X | X | X | ◯ |

*2: Vickers Hardness Distribution Shape of Outer Filament
*3: Forward-Reverse Torsion Test Result

TABLE 4

| Characteristic | Sample 24 | Sample 25 | Sample 26 | Sample 27 | Sample 28 |
|---|---|---|---|---|---|
| Twisting Performance | ⊙ | ⊙ | X | Δ | ⊙ |
| Breaking Load N | 1254 | 1284 | 1176 | 1205 | 1117 |
| Fatigue Resistance | 126 | 121 | 98 | 102 | 100 |
| Twisting Efficiency (%) | 96.0 | 95.6 | 91.4 | 92.1 | 95.0 |
| Vickers Hardness Distribution Shape | C | D | B | B | A |
| Forward-Reverse Torsion Test Result | ◯ | ◯ | X | X | ◯ |

TABLE 5

| Characteristic | Sample 29 | Sample 30 | Sample 31 | Sample 32 |
|---|---|---|---|---|
| Tensile Strength (N/mm$^2$) | 3342 | 3381 | 3410 | 2920 |
| Twist Value (turns/100 d) | 35 | 32 | 32 | 31 |
| Vickers Hardness Distribution Shape | C | D | B | A |
| Forward-Reverse Torsion Test Result | ◯ | ◯ | X | ◯ |

TABLE 5-continued

| Characteristic | Sample 29 | Sample 30 | Sample 31 | Sample 32 |
|---|---|---|---|---|
| Fatigue Limit (N/mm$^2$) *1 | 980 | 980 | 882 | 784 |
| Die Approach Angle (2 α°) | 10 | 10 | 10 | 12 |
| Die Bearing Length | 0.3 d$_1$ | 0.3 d$_1$ | 0.5 d$_1$ | 0.5 d$_1$ |
| Skin Pass Area Reduction (%) | 2.0 | 3.0 | 4.5 | — |
| Final Filament Temperature (°C.) | 147 | 148 | 162 | — |
| Number of Diamond Dies Used | 4 | 4 | 4 | 0 |

*1: Final Wet Drawing Conditions

TABLE 6

| Characteristic | Sample 33 | Sample 34 | Sample 35 | Sample 36 |
|---|---|---|---|---|
| Twisting Performance | ◉ | ◉ | Δ | ◉ |
| Breaking Load N | 2450 | 2489 | 2430 | 2136 |
| Fatigue Resistance | 126 | 123 | 98 | 100 |
| Twisting Efficiency (%) | 93.4 | 94.0 | 91.0 | 93.2 |
| *2 | C | D | A | A |
| *3 | ○ | ○ | X | ○ |

*2: Vickers Hardness Distribution Shape of Outer Filament
*3: Forward-Reverse Torsion Test Result

TABLE 7

| Characteristic | Sample 37 | Sample 38 | Sample 39 | Sample 40 | Sample 41 | Sample 42 | Sample 43 | Sample 44 | Sample 45 |
|---|---|---|---|---|---|---|---|---|---|
| *4 | | | | | | | | | |
| Strength Class | s.h.t. | s.h.t. | s.h.t. | s.h.t. | s.h.t. | s.h.t. | h.t. | s.h.t. | h.t. |
| Diameter (mm) | 0.28 | 0.28 | 0.28 | 0.28 | 0.28 | 0.28 | 0.28 | 0.28 | 0.25 |
| Tensile Strength (N/mm$^2$) | 3548 | 3548 | 3548 | 3548 | 3548 | 3616 | 3175 | 3548 | 3254 |
| Forward-Reverse Torsion Test Result | ○ | ○ | ○ | ○ | ○ | X | ○ | ○ | ○ |
| Vickers Hardness Distribution Shape | C | C | C | C | C | B | A | C | A |
| Twisting Performance | ◉ | ◉ | ◉ | ◉ | ◉ | X | ◉ | ◉ | ◉ |
| *5 | | | | | | | | | |
| Structure | 2 + 1 | 2 + 1 | 2 + 1 | 2 + 1 | 2 + 1 | 2 + 1 | 2 + 1 | 1 × 3 | 1 × 4 |
| Diameter (mm) | 0.574 | 0.569 | 0.570 | 0.576 | 0.572 | 0.576 | 0.572 | 0.601 | 0.612 |
| Winding Pitch (twisting pitch) (mm) | 14 | 16 | 18 | 12 | 20 | 16 | 16 | (10) | (10) |
| Winding Pitch (twisting pitch)/Wire diameter | 50.0 | 57.1 | 64.3 | 42.9 | 71.4 | 57.1 | 57.1 | 35.7 | 40.0 |
| Strength (N) | 628 | 632 | 627 | 613 | 627 | 597 | 556 | 614 | 601 |
| Twisting Efficiency (%) | 95.9 | 96.5 | 95.7 | 93.4 | 95.7 | 89.3 | 94.8 | 93.7 | 94.1 |
| Bending Stiffness Index | 101 | 105 | 104 | 100 | 105 | 106 | 96 | 98 | 100 |
| Fatigue Resistance Index | 83 | 85 | 83 | 80 | 80 | 58 | 54 | 61 | 100 |
| Rubber Penetration (%) | 90 | 85 | 85 | 80 | 80 | 85 | 85 | 30 | 20 | s.h.t.: super high tensile
h.t.: high tensile
*4: Steel Wire Characteristics
*5: Steel Cord Characteristics

TABLE 8

| Characteristic | Sample 46 | Sample 47 | Sample 48 | Sample 49 | Sample 50 | Sample 51 |
|---|---|---|---|---|---|---|
| *4 | | | | | | |
| Strength Class | s.h.t. | s.h.t. | s.h.t. | s.h.t. | h.t. | s.h.t. |
| Diameter (mm) | 0.23 | 0.23 | 0.23 | 0.23 | 0.23 | 0.23 |
| Tensile Strength (N/mm$^2$) | 3655 | 3655 | 3655 | 3675 | 3293 | 3655 |
| Forward-Reverse Torsion Test Result | ◯ | ◯ | ◯ | X | ◯ | ◯ |
| Vickers Hardness Distribution Shape | C | C | C | B | A | C |
| Twisting Performance | ⊙ | ⊙ | ⊙ | X | ⊙ | ⊙ |
| *5 | | | | | | |
| Structure | 2 + 1 | 2 + 1 | 2 + 1 | 2 + 1 | 2 + 1 | 1 × 3 |
| Diameter (mm) | 0.472 | 0.470 | 0.470 | 0.473 | 0.471 | 0.494 |
| Winding Pitch (twisting pitch) (mm) | 12 | 14 | 16 | 14 | 14 | (10) |
| Winding Pitch (twisting pitch)/Wire diameter | 52.2 | 60.9 | 69.6 | 60.9 | 60.9 | 43.5 |
| Strength (N) | 438 | 439 | 441 | 417 | 386 | 425 |
| Twisting Efficiency (%) | 96.2 | 96.4 | 96.9 | 91.0 | 94.0 | 94.0 |
| Bending Stiffness Index | 102 | 104 | 104 | 105 | 95 | 100 |
| Fatigue Resistance Index | 132 | 135 | 128 | 97 | 90 | 100 |
| Rubber Penetration (%) | 85 | 85 | 85 | 85 | 80 | 20 | s.h.t.: super high tensile
h.t.: high tensile
*4: Steel Wire Characteristics
*5: Steel Cord Characteristics

TABLE 9

| Characteristic | Sample 52 | Sample 53 | Sample 54 |
|---|---|---|---|
| *4 | | | |
| Strength Class | s.h.t | s.h.t. | h.t. |
| Diameter (mm) | 0.32 | 0.32 | 0.30 |
| Tensile Strength (N/mm$^2$) | 3508 | 3508 | 3058 |
| Forward-Reverse Torsion Test Result | ◯ | ◯ | ◯ |
| Vickers Hardness Distribution Shape | D | D | A |
| Twisting Performance | ⊙ | ⊙ | ⊙ |
| *5 | | | |
| Structure | 2 + 1 | 1 × 3 | 1 × 4 |
| Diameter (mm) | 0.657 | 0.690 | 0.726 |
| Winding Pitch (twisting pitch) (mm) | 16 | (12) | (10) |
| Winding Pitch (twisting pitch)/Wire diameter | 50.0 | 37.5 | 33.3 |
| Strength (N) | 809 | 787 | 812 |
| Twisting Efficiency (%) | 95.7 | 93.7 | 94.0 |
| Bending Stiffness Index | 102 | 97 | 100 |
| Fatigue Resistance Index | 87 | 71 | 100 |
| Rubber Penetration (%) | 85 | 20 | 20 | s.h.t.: super high tensile
h.t.: high tensile
*4: Steel Wire Characteristics
*5: Steel Cord Characteristics

TABLE 10

| Characteristic | Sample 55 | Sample 56 |
|---|---|---|
| *4 | | |
| Strength Class | s.h.t. | s.h.t. |
| Diameter (mm) | 0.35 | 0.35 |
| Tensile Strength (N/mm$^2$) | 3469 | 3469 |
| Forward-Reverse Torsion Test Result | ◯ | ◯ |
| Vickers Hardness Distribution Shape | D | D |
| Twisting Performance | ⊙ | ⊙ |
| *5 | | |
| Structure | 2 + 1 | 1 × 3 |
| Diameter (mm) | 0.720 | 0.757 |
| Winding Pitch (twisting pitch) (mm) | 20 | (12.5) |
| Winding Pitch (twisting pitch)/Wire diameter | 57.1 | 35.7 |
| Strength (N) | 954 | 931 |
| Twisting Efficiency (%) | 95.4 | 93.1 |
| Bending Stiffness Index | 104 | 100 |
| Fatigue Resistance Index | 114 | 100 |
| Rubber Penetration (%) | 85 | 30 | s.h.t.: super high tensile
h.t.: high tensile
*4: Steel Wire Characteristics
*5: Steel Cord Characteristics

What is claimed is:

1. A steel cord made by a process comprising twisting together three steel wires with a bunching-type twisting machine; and
 wherein each of said steel wires has a surface, an interior with a central portion, a wire diameter, a tensile strength, Y in N/mm$^2$, such that $Y \geq -1960d + 3920$, said d being the wire diameter in mm, and a flat Vickers hardness distribution in a cross-section perpendicular to a length direction thereof from the surface to the interior, but excluding the central portion having a central portion diameter corresponding to ¼ of said wire diameter of said steel wire; and each of said steel wires is made by a method comprising the steps of:
 a) wet drawing a carbon steel wire rod material containing 0.80 to 0.89% by weight carbon to a predetermined intermediate diameter and subsequently heat-treating and plating to form a final raw material;

b) then wet drawing the final raw material to form the steel wire;

wherein said wet drawing steps are performed with a plurality of drawing dies, each of the drawing dies is provided with a drawing hole having a drawing hole diameter $d_1$ and the drawing die has an approach angle $2\alpha$ equal to from 8° to 10° and a bearing length of 0.3 $d_1$, and the wet drawing of the final raw material includes a final drawing step performed by wet drawing the final raw material through a double die, said double die consisting of an upstream one of said drawing dies and a downstream one of said drawing dies arranged in series, of which the downstream one of said drawing dies of said double die performs a skin pass of area percentage reduction of from 1.2 to 3.9%, and the double die of the final drawing step and at least one of the drawing dies upstream of the double die have sintered diamond nibs and the steel wire immediately after passing through the double die of the final drawing step has a temperature thereof controlled so as to be less than 150° C.; and wherein two of the three steel wires are substantially parallel to each other, while a third of the three wires is wound around said two steel wires parallel to each other in a spiral at a pitch of 45 to 65 times the wire diameter.

2. A radial tire including a reinforcing material comprising a plurality of steel cords, each of said steel cords being made by a process comprising the steps of twisting together three steel wires with a bunching-type twisting machine; and wherein each of said steel wires has a surface, an interior with a central portion, a wire diameter, a tensile strength, Y in N/mm², such that $Y \geq -1960d+3920$, said d being the wire diameter in mm, and a flat Vickers hardness distribution in a cross-section perpendicular to a length direction thereof from the surface to the interior, but excluding the central portion having a central portion diameter corresponding to ¼ of said wire diameter of said steel wire; and each of said steel wires is made by a method comprising the steps of:

a) wet drawing a carbon steel wire rod material containing 0.80 to 0.89% by weight carbon to a predetermined intermediate diameter and subsequently heat-treating and plating to form a final raw material;

b) then wet drawing the final raw material to form the steel wire having the wire diameter, wherein said wet drawing steps are performed with a plurality of drawing dies, each of the drawing dies is provided with a drawing hole having a drawing hole diameter $d_1$ and the drawing die has an approach angle $2\alpha$ equal to from 8° to 10° and a bearing length of 0.3 $d_1$, and the wet drawing of the final raw material includes a final drawing step performed by wet drawing the final raw material through a double die, said double die consisting of an upstream one of said drawing dies and a downstream one of said drawing dies arranged in series, of which the downstream one of said drawing dies of said double die performs a skin pass of area percentage reduction of from 1.2 to 3.9%, and the double die of the final drawing step and at least one of said drawing dies upstream of the double die have sintered diamond nibs and the steel wire immediately after passing through said double die of the final drawing step has a temperature controlled so as to be less than 150° C.; and wherein two of the three steel wires are substantially parallel to each other in each of said steel cords, while a third of the three wires is wound around said two steel wires parallel to each other in a spiral at a pitch of 45 to 65 times the wire diameter.

* * * * *